United States Patent [19]

Slattery

[11] 4,377,062
[45] Mar. 22, 1983

[54] SNAPPER HEAD FOR HARVESTING MAIZE

[76] Inventor: Dugmore D. Slattery, P.O. Box 777, Potgietersrus, South Africa

[21] Appl. No.: 279,565

[22] Filed: Jul. 1, 1981

[30] Foreign Application Priority Data

Jul. 22, 1980 [ZA] South Africa .................. 80/4418

[51] Int. Cl.³ ........................................... A01D 45/02
[52] U.S. Cl. ........................................ 56/14.3; 56/95; 56/110; 56/119
[58] Field of Search .................. 56/95, 110, 107, 119, 56/94, 14.3, 14.5

[56] References Cited

U.S. PATENT DOCUMENTS

| | | | |
|---|---|---|---|
| 72,811 | 12/1867 | Crandall | 56/110 |
| 348,627 | 9/1886 | Hartley | 56/110 |
| 890,648 | 6/1908 | Hibbs | 56/110 |
| 2,571,865 | 10/1951 | Greedy et al. | 56/95 |
| 2,716,321 | 8/1955 | Schaaf et al. | 56/107 |
| 2,946,170 | 7/1960 | Anderson | 56/110 |

Primary Examiner—Jay N. Eskovitz
Attorney, Agent, or Firm—Parmelee, Bollinger & Bramblett

[57] ABSTRACT

A snapper head for harvesting maize has gathering wheels and a gathering snout for gathering maize stalks of maize plants and for guiding them into a slot in the head. The slot is defined between a snapper plate and a snapper shoulder on the opposite side of the slot to the snapper plate for together snapping crop, that is ears to be harvested, from maize stalks guided into said slot. Beneath the slot there are snapper rolls for engaging stalks within said slot and drawing the stalks downwardly to draw crop against the snapper shoulder and snapper plate for separation from the maize stalks. A conveyor screw extends along an axis substantially parallel to, above, and to one side of said slot for conveying crop separated from maize stalks, away from the slot. The screw can also extend forwardly of the slot for gathering maize into the slot.

8 Claims, 4 Drawing Figures

SNAPPER HEAD FOR HARVESTING MAIZE

This invention relates to snapper heads and in particular to snapper heads suitable for harvesting maize.

Snapper heads are extensively employed for gathering the crop, that is the ears of corn, from maize plants. These snapper heads are a development of original 'corn pickers' which used two counter-rotating rollers to grip the maize stalk and to pull it downwardly while in the process snapping off the crop, which was conveyed to a receptacle at the rear of the picker.

More suitable snapper heads were developed to be simple, durable and cost-effective and one form known to the Applicant had a single-row tractor-drawn arrangement for harvesting the maize crop after natural field-drying of the maize. These machines threshed substantially the whole plant, which meant that more material was handled, and that difficulties arose when handling plants with a high moisture content. As yields increased and energy costs rose and earlier harvesting became desirable, these machines became less acceptable. Machines for harvesting two or more rows simultaneously have been introduced. However, the heads are costly to purchase and maintain, and can be more difficult to use in the field.

These machines incorporate gathering chains for feeding maize stalks into a slot. These chains are arranged in guides and are driven by a right-angled gear drive, which are costly and are subject to wear and maintenance problems. Furthermore, the chain does not always provide adequate gathering beyond the front end of the slot or adequate clearance of separated crops.

It is clearly desirable to provide a snapper head which is more economical to make and maintain, and which is of increased efficiency in handling plants with a higher moisture content.

According to the invention, there is provided a snapper head having snapper means defining a slot into which plants to be harvested can pass, means for drawing stalks of the plants downwardly through the slot, enabling the crop to be separated from the stalks by the snapper means, and a conveyor screw operating above the slot for conveying the crop removed from the stalks.

The screw may extend beyond the leading end of the slot and can then serve to gather the stalks into and along the slot in addition to conveying the crop. The screw can also clear the slot of material that may lodge there.

The snapper head may be provided with one or more gathering wheels rotating on a vertical or inclined axis adjacent to the leading edge of the slot for guiding material into the slot. Gathering snouts may be provided to gather and guide the crop towards the slot in a conventional manner and therefore also serve to guide the stalks towards the gathering wheels.

The conveyor screw axis may be aligned at any suitable angle to the proposed line of travel of the harvester. In the case where the angle is relatively large the provision of the gathering wheels is particularly advantageous.

In one form of the invention, the screw conveyor axis may be substantially parallel to the proposed line of travel of the harvester on which the snapper head is mounted and its trailing end may end with a paddle for feeding crops away from the screw conveyor and into a threshing cylinder.

The means for drawing the stalks of the plants downwardly may comprise snapper rolls having axes lying substantially parallel to, below, and to one side of the axis of the conveyor screw. The snapper rolls may be driven from the shaft on which the screw is mounted, for example by roller chain and sprockets. Suitable adjustment means may be provided for altering the distance between the leading ends of the rolls and to alter the width of the slot between the snapper means, if desired.

The snapper means may have a snapper plate and a snapper shoulder above the level of the snapper plate and on the opposite side of the slot to the snapper plate.

Naturally, multi-row heads and heads to fit various types of machines can be developed using the snapper head of the invention.

In order to increase the versatility of the snapper head, the slot can be closed, when desired, and cutting means can be provided at the head of or in front of the closed slot so that whole plants can be reaped. The snapper head can then be used for row-crops which do not require snapper rolls.

An embodiment of the invention will now be described, by way of example, with reference to the accompanying schematic drawing, in which FIG. 1 shows a snapper head according to the invention;

Figures 1, 2:
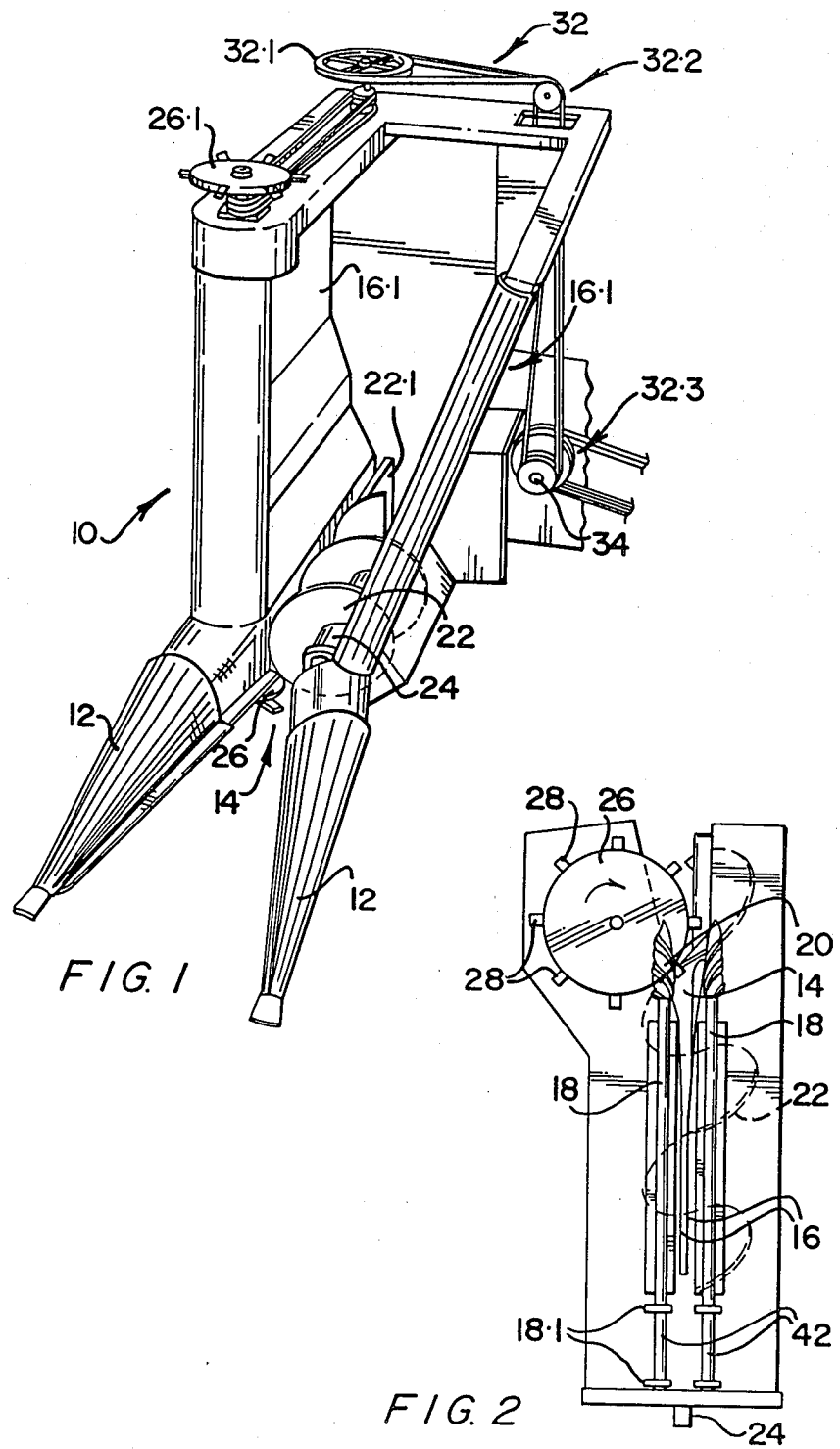
FIG. 2 is an under plan view of the snapper head.

The snapper head 10 shown in the drawing comprises a pair of gathering snouts 12 for guiding plants, in this case generally maize, towards a slot 14 defined between snapper means 16 at the lower edges of upright walls 16.1.

The snapper means comprises a snapper plate 16.2 on one side of slot 14, and a snapper shoulder 16.3 formed by an upper part of a wedge member on the other side of the slot. The shoulder is slightly above the level of the plate 16.2.

Snapper rolls 18 are provided below the slot 14 for drawing stalks of plants downwardly through the slot, enabling crops to be separated from the stalks by the snapper means. The snapper rolls 18 may be of any suitable construction and, as shown in FIG. 2, may have auger heads 20 for guiding the stalks of plants into the slot. They are supported cantilever-fashion in bearings 18.1.

A conveyor screw 22 is located above and to one side of the slot 14 and has an axis substantially parallel to the slot and thus to the proposed line of travel of the head, in use. The screw 22 operates above the slot 14 and the snapper means 16 between the walls 16.1 and performs the function of gathering and conveying crops. The screw extends beyond the leading end of the slot and can thus also help to convey stalks along the slot. It can also help to clean the slot of any material that may lodge there. The conveyor screw may end in a paddle 22.1 at its trailing end for feeding of crop material into a threshing cylinder through an opening 22.2.

Figure 3:
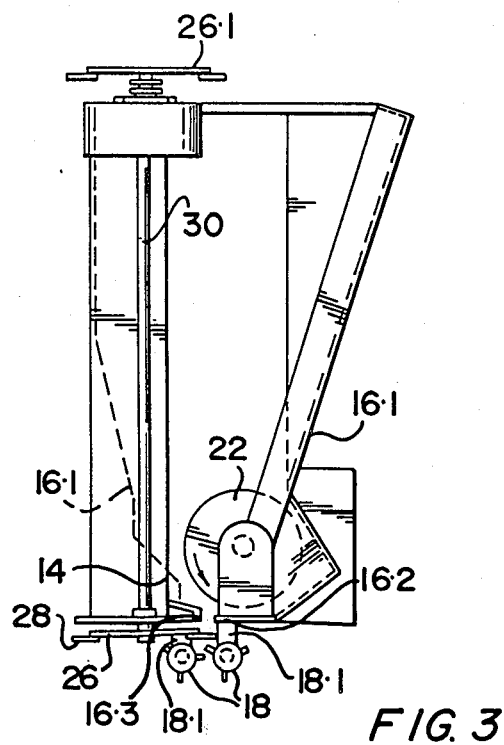
FIG. 3 is a front view of the snapper head with the gathering snouts removed.

The axes of the snapper rolls 18 lie substantially parallel to, below and to one side of the axis of the conveyor screw as shown in FIG. 3. The conveyor screw 22 is mounted on a shaft 24 which can be driven in any suitable manner and the snapper rolls 18 can be driven from the same shaft by roller chains and sprockets. The relatively expensive drive line found in many conventional snapper heads is thus eliminated.

A lower gathering wheel 26 having gathering arms 28 is located at the entrance to the slot 14 and is rotatable on a vertical shaft 30. An upper gathering wheel 26.1 is provided at the top of the shaft. The shaft 30 can be rotated by a belt drive arrangement 32 associated with the upper end of the shaft 30. The belt drive may have a pulley 32.1 mounted towards the rear, upper part of the snapper head and a further, right-angled belt drive 32.2 may be provided to enable this pulley to be driven by a drive pulley 32.3 driven by belts from any suitable drive source.

Figure 4:
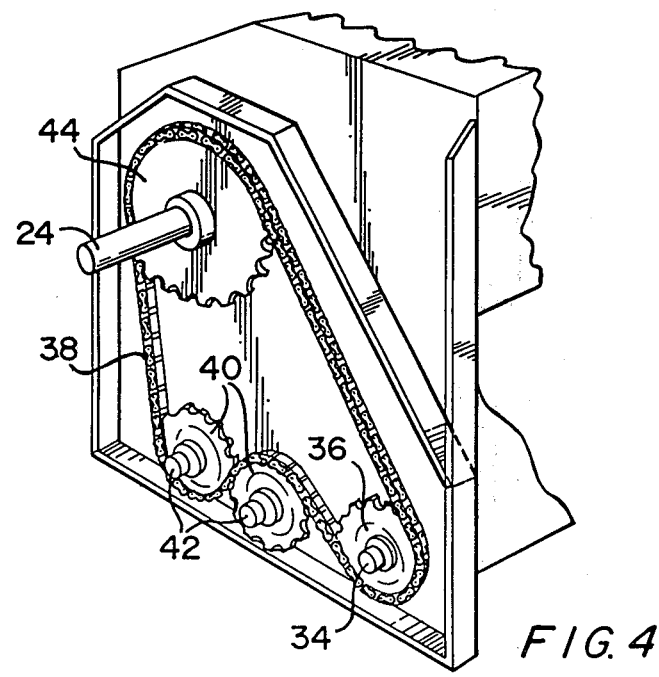
FIG. 4 illustrates the drive for the conveyor screw and snapper rolls of the snapper head.

The pulley 32.3 is mounted on a drive shaft 34 carrying a sprocket 36 in a slim drive housing. A single chain 38 passes around the sprocket 36 and around sprockets 40 on shafts 42 of the snapper rolls 18 and sprocket 44 on conveyor screw shaft 24. As shown in FIG. 4, the chain 38 is directed around the sprockets 40 in such a way as to ensure that they rotate in opposite directions.

The drive system for the conveyor screw and snapper rolls is thus simple and easy to manufacture and maintain.

In use, the gathering wheels serve to guide material into the slot 14 and between the snapper rolls 18 after the plants have initially travelled between the gathering snouts 12. The gathering wheels have the advantage that they can feed plants towards the slot whether the plants are exactly aligned with the slot or not.

It will be appreciated that with this snapper head, plants, in this case maize, are thus guided into the slot 14 by the snouts 12 and the gathering wheels 26 and the stalks of the plants are drawn downwardly through the slot 14 by the snapper rolls 18. This enables the crop to be separated from the stalks by the snapper means 16. The conveyor screw 22 helps to move the stalks along the slot 14 and also to clean the slot of any material that may lodge there. The screw also performs the function of gathering the crop into the slot and of feeding it to the paddle wheel, which in turn supplies the crop to the threshing cylinder.

Suitable adjustment means may be provided to alter the distance between the axes of the rolls 18 at their leading ends and to alter the width of the slot 14 between the snapper means.

For row-crops, the slot 14 can be closed by a suitable plate and the front of the plate may form a fixed blade. The gathering arms 28 or alternatively additional blades mounted on the lower gathering wheel 26, may be used for shearing material as it moves against this fixed blade. The conveyor screw 22 will feed the sheared material rearwardly. Instead of providing a single screw 22, screws may be provided one on each side of the slot, if desired.

In testing, it has been indicated that the provision of the screw 22 with the shoulder 16.3 can help to allow more unwanted material to pass through the slot while reducing grain loss compared with various simple chain feed systems. Furthermore, the shoulder can help to reduce losses of kernels during the snapping action of the device.

I claim:

1. A snapper head for harvesting maize, said snapper head having:
    snapper means defining a slot into which plants to be harvested can pass, said snapper means comprising a snapper plate and a snapper shoulder above the level of the snapper plate and on the opposite side of the slot to the snapper plate,
    means for drawing stalks of the plants downwardly through the slot while said snapper means inhibits passage of crop through the slot, enabling the crop to be separated from the stalks by the snapper means, and
    means for gathering the stalks into and along the slot, said means comprising a conveyor screw rotatable about an axis at the same side of the slot as the snapper plate and extending over the slot and above the snapper shoulder for guiding stalks along the slot and for conveying the crop separated from the stalks away from said slot.

2. A snapper head according to claim 1, wherein means are provided forwardly of the slot for guiding stalks into the slot and wherein the screw extends beyond the leading end of the slot for gathering the stalks forwardly of the slot and for guiding the stalks into the slot.

3. A snapper head according to claim 2, including at least one gathering wheel rotatable about an upwardly extending axis adjacent to the leading edge of the slot for guiding material into the slot and feeding it into engagement with the screw.

4. A snapper head according to claim 2, wherein the means provided forwardly of the slot comprises chainless gathering snouts to gather and guide the crop towards the slot and towards said at least one gathering wheel.

5. A snapper head according to claim 4, wherein the conveyor screw has a shaft rotatable about said axis and extending substantially parallel to said slot and generally above said snapper plate.

6. A snapper head according to claim 1, wherein the screw conveyor has a trailing end with a paddle for feeding crops away from the screw conveyor and towards a threshing cylinder.

7. A snapper head according to claim 1, wherein the means for drawing the stalks of the plants downwardly comprises snapper rolls below the snapper means and conveyor screw and having axes lying substantially parallel to said axis.

8. A snapper head for harvesting maize, said snapper head comprising:
    a slot for receiving stalks of maize plants,
    means for gathering maize stalks and for guiding them into said slot without engagement of said stalks by gathering chains, said means comprising gathering snouts for guiding the stalks towards the slot and gathering wheels rotatable about upwardly extending axes and having gathering arms for gathering stalks into the slot,
    a snapper plate and a snapper shoulder above the level of the snapper plate and on the opposite side of the slot to the snapper plate for together providing snapper means for snapping crop to be harvested from maize stalks guided into said slot,
    snapper rolls beneath said slot for engaging stalks within said slot and drawing the stalks downwardly to draw crop against said snapper means for separation from said stalks, and
    a conveyor screw extending along an axis substantially parallel to, above, and to one side of said slot, said conveyor screw extending forwardly of said slot and over said slot for further gathering stalks into the slot and for conveying crop separated from maize stalks away from the slot, said axis being located at the same side of the slot as the snapper plate.

* * * * *